Figure 1:
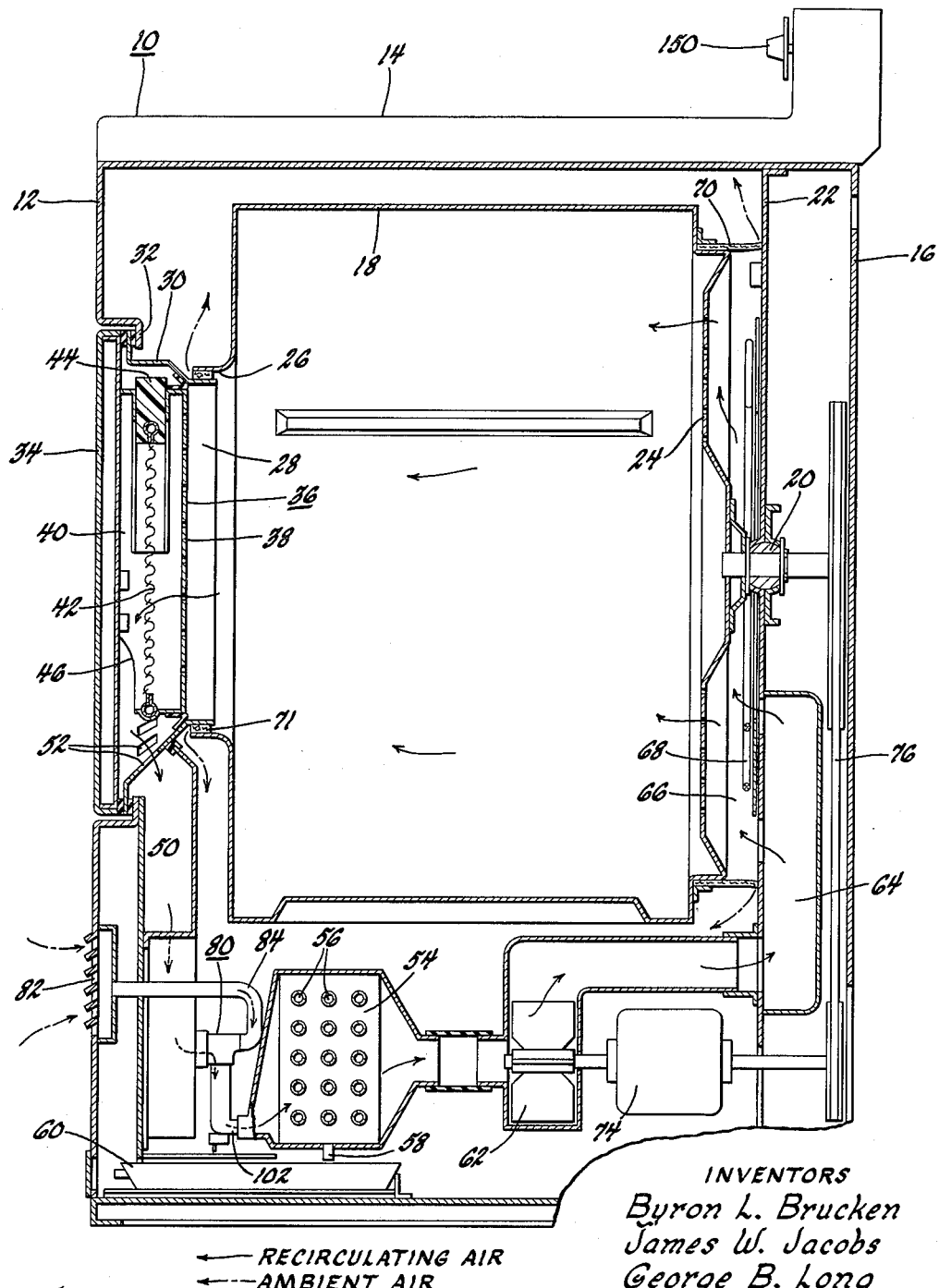

← RECIRCULATING AIR
← — — AMBIENT AIR

INVENTORS
Byron L. Brucken
James W. Jacobs
George B. Long
BY
Frederick M. Ritchie
THEIR ATTORNEY Nov. 9, 1965   B. L. BRUCKEN ETAL   3,216,126
METHOD AND APPARATUS FOR CONTROL OF A DOMESTIC APPLIANCE
Filed April 30, 1962   3 Sheets-Sheet 2
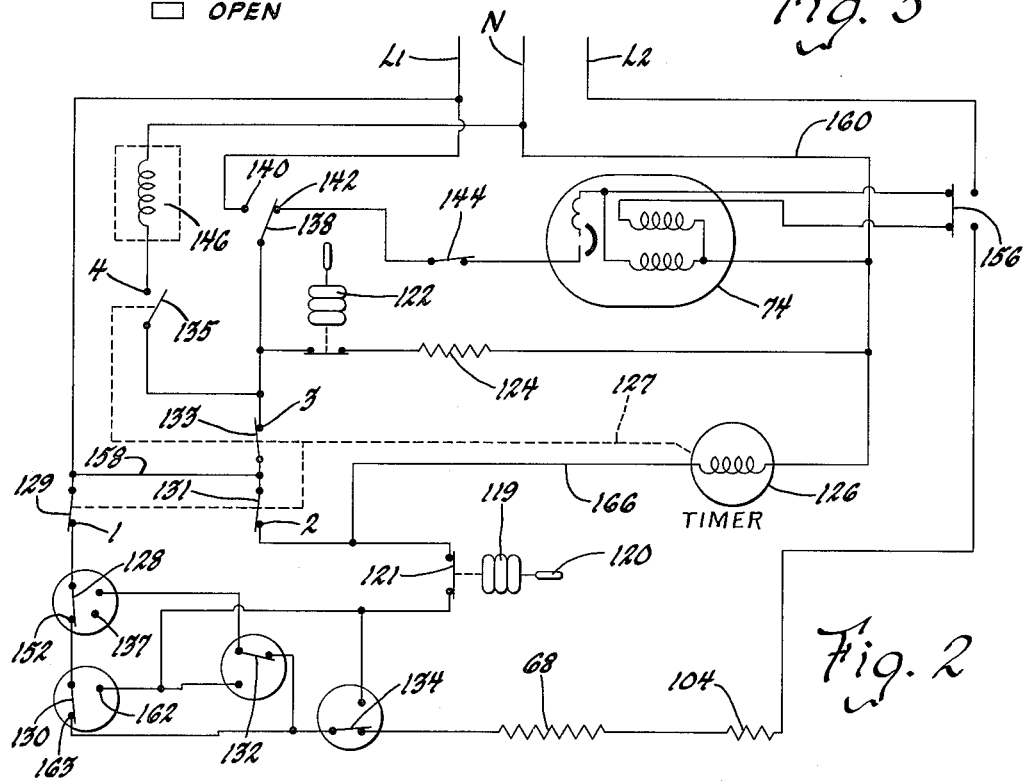
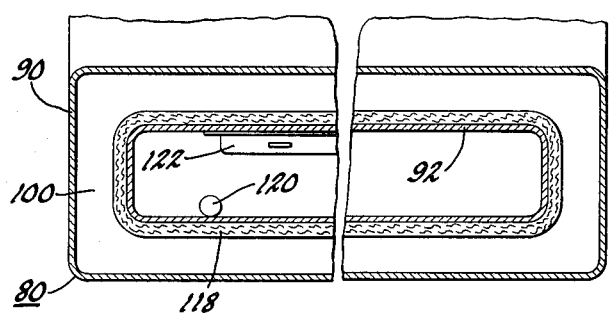
INVENTORS
Byron L. Brucken
James W. Jacobs
George B. Long
BY
Frederick M. Ritchie
THEIR ATTORNEY

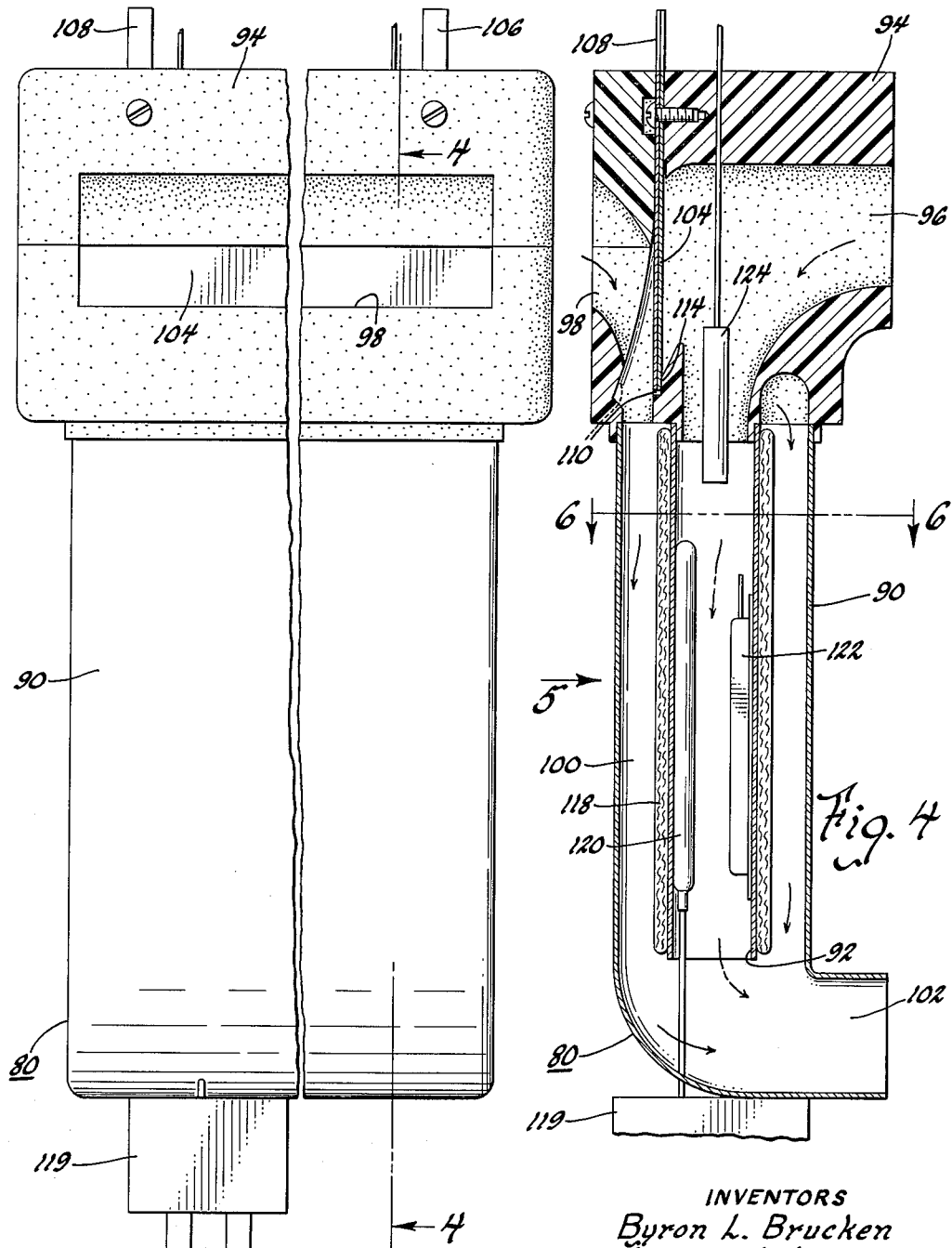

United States Patent Office
3,216,126
Patented Nov. 9, 1965

3,216,126
METHOD AND APPARATUS FOR CONTROL OF A DOMESTIC APPLIANCE
Byron L. Brucken, James W. Jacobs, and George B. Long, Dayton, Ohio, assignors to General Motors Corporation, Detroit, Mich., a corporation of Delaware
Filed Apr. 30, 1962, Ser. No. 191,017
9 Claims. (Cl. 34—45)

This invention relates generally to domestic appliances and more particularly to an improved cycle termination control for a clothes dryer.

Prior art drying cycle termination controls have sensed the relative humidity of exhaust air as a measure of clothes dryness. One method of determining relative humidity requires that the wet and dry bulb temperatures of the particular air flow be known. However, the requirement for a wet bulb temperature reading makes such systems impractical since a constant source of moisture for the wet bulb indicator is not an easy nor a dependable thing to provide. This invention is directed to a moisture indicator having means of generating a constant source of moisture for the wet bulb sensor in order to make the control self-sustaining.

Accordingly, it is a general object of this invention to provide a wet bulb temperature indicator which generates its own moisture for the wet bulb.

Another object of this invention is the provision of an improved cycle termination control for a clothes dryer which uses the moisture contained in the dryer exhaust air in conjunction with evaporative cooling to terminate the cycle.

Another object of this invention is the provision of a dryer termination control which utilizes the dew point of the dryer exhaust air to selectively operate a timer motor for running out the drying cycle.

A more specific object of this invention is the provision of a dryer termination control based on exhaust air dew point related to a constant temperature.

Further objects and advantages of the present invention will be apparent from the following description, reference being had to the accompanying drawings wherein a preferred embodiment of the present invention is clearly shown.

In the drawings:
FIGURE 1 is a side sectional view, partly in elevation, of a clothes dryer suitable for use with this invention;
FIGURE 2 is a schematic wiring diagram of a dryer control circuit incorporating the termination device of this invention;
FIGURE 3 is a timer cycle chart showing the relationship of the contacts and components illustrated in FIGURE 2;
FIGURE 4 is a sectional view, partly in elevation, showing the air moisture condition sensing device of this invention taken along the line 4—4 in FIGURE 5;
FIGURE 5 is an elevational view taken in the direction of arrow 5 in FIGURE 4; and
FIGURE 6 is a fragmentary sectional view taken along line 6—6 in FIGURE 4.

In accordance with this invention and with reference to FIGURE 1, a clothes dryer 10 is illustrated. The dryer includes a casing having a front wall 12, top wall 14 and a rear wall 16. Within the casing a tumbling drum 18 is rotatably mounted, as at 20, on a vertical rear bulkhead 22. The tumbling drum 18 has a perforated rear wall 24 and a front collar 26 journaled on a telescoping access flange 28 which is a part of a front port plate 30 supported in turn on a recessed shoulder 32 of the cabinet front wall. The recessed shoulder 32 forms an opening which indexes with the flange 26 of the tumbling drum. A door 34 is hingedly mounted to the front wall of the dryer to selectively close the dryer cabinet opening. Carried on the door 34 is a lint collector housing shown generally at 36 and including a perforated rear wall 38 and a generally cylindrical housing 40 in which a lint collector screen 42 may reside. The lint collector screen 42 is made slidably removable by a handle 44 which extends through an opening in the top of the lint collector housing. At the rear of the housing 36, a cutout 46 is provided with the screen 42 interposed between this opening and the perforations of the lint collector rear wall 38. Thus, air may enter a front duct 50 after passing through the lint screen 42 and an arcuate arrangement of ports 52 in the front port plate 30.

Air moving through the front duct 50 enters a condenser 54 having a plurality of generally horizontal cooling tubes 56 which serve to condense the moisture from the circulating air—this moisture or condensate dropping through a drain 58 into a catch tray 60. A blower 62 serves to circulate the air from the front of the tumbling drum through the condenser and returns the air by way of a rear duct 64 into an annular heater chamber 66 having a heater 68 between the bulkhead and the perforated rear wall of the tumbling drum. Suitable seals 70 and 71 are provided to provide a generally closed air circulating system. The blower 62 is operated by a motor 74 which also rotates the tumbling drum 18 by way of a belt and pulley system 76.

The termination control system of this invention incorporates a moisture sensing assembly or dew point indicator shown generally at 80 in FIGURE 1. The moisture sensing assembly receives recirculating air as shown with solid line arrows as well as ambient or atmospheric air shown with dash-dot arrows. This ambient air may enter the cabinet through an opening or grille 82 in the front wall 12 of the cabinet, proceeding then to the moisture sensing assembly through a duct 84. Thus, a mixture of recirculating and ambient air is supplied to the condenser 54. Since additional air is entering the air circuit at all times, the system is maintained under positive pressure and slight leakage will occur through the seals 70 and 71 to keep the system in proper balance. Although a condenser dryer has been illustrated in FIGURE 1, it should be understood that the termination control of this invention will work equally well on a vented dryer. In this regard it would be necessary merely to remove the condenser 54 and connect the blower intake as well as the exhaust 102 of the moisture sensing assembly to the atmosphere.

The moisture sensing assembly will best be understood with reference to FIGURES 4, 5 and 6. Referring in particular to FIGURE 4, the assembly is shown comprised of an outer duct or housing 90, an inner duct or sense tube 92 forming with said outer duct an annular absorbing chamber 100—both ducts carried on a support portion 94 of plastic or other suitable material. The support portion 94 is hollowed to form passageways defining a fresh air inlet 96 connected to the atmosphere by way of duct 84 and a recirculating air inlet 98 connected to the front duct 50 of the dryer. The fresh air inlet 96 is continuously connected to the interior of the sense tube 92 whereas the recirculating air inlet 98 is opened and closed depending respectively on whether the moisture sensing assembly is absorbing moisture from the dryer exhaust air or re-evaporating the absorbed moisture as an indicator of clothes dryness. It is in the mixing chamber outlet 102 of the assembly that the fresh air and the dryer exhaust or recirculating air commingle. This mixture then enters the condenser 54 (FIGURE 1).

To selectively control air flow through the moisture sensing assembly 80, there is provided an air diverter bimetal valve means 104 having electrical connector spades 160 and 108 extending outside of the support portion 94. The bimetal has a normal or de-energized position (phantom line FIGURE 4) for preventing communication between the recirculating air inlet 98 and the absorbent chamber 100 while establishing communication between the fresh air inlet 96 and said chamber. When energized, the bimetal terminal edge 110 moves to the support portion shoulder 114 (solid line) to establish communication between the recirculating air inlet and the absorbent chamber 100 while preventing air flow communication between the chamber and the fresh air inlet. It should be noted that the interior of the sense tube 92 is in open communication with the atmosphere at all times. The suction of the blower 62 will induce a steady supply of relatively cool outside air through the assembly as long as the blower is operating.

In order to sense the dryness condition of a dryer exhaust air, it is necessary to determine the moisture content of the air. For this purpose, this invention provides a means for picking up or absorbing moisture from the air leaving the tumbling drum. The sense tube 92 is wrapped with a moisture attracting wicking 118 over which the exhaust air must flow when the bimetal 104 is open (solid line). A dew point thermostat 119 has within the sense tube 92 a dew point thermostat bulb 120 disposed in thermal exchange relationship with the sense tube and thus the wicking.

For reasons of control calibration it is necessary for the temperature of the fresh air flow through the sense tube to remain at a constant level. Thus, a sense heater 124 is positioned at the inlet end of the sense tube and adapted to be selectively energized by a thermostat bulb 122 to maintain temperatures between 100° and 110° F. within the sense tube at all times. This constant temperature, as will be understood more fully hereinafter, is to provide a constant reference to which the dew point of the dryer recirculating or exhaust air may be related.

Turning now to the control circuit of FIGURE 2, the dryer is shown energizable through a conventional 115–230 volt, alternating current, power source $L_1$, N and $L_2$. A timer motor 126 through its timer shaft 127 actuates a plurality of cam actuated timer switches 129, 131, 133 and 135 into selective engagement respectively with timer contacts 1, 2, 3 and 4—a predetermined timed cycle being built into the timer motor and its associated switches. These switch contacts will be opened and closed as shown in the cycle chart of FIGURE 3—the hatched areas indicating a closed switch condition.

In addition to those elements set forth hereinbefore, the dryer will include the conventional components of a heat selector switch 128 which may be positioned in series with a High temperature thermostat 130 or a Low temperature thermostat 132. Selector switch 128 may also have a No Heat setting 137. For safety the heater circuit may include a high limit switch 134 which will de-energize the heater circuit and run out the cycle in case of a malfunction tending to overheat the interior of the dryer. Other safety features in the circuit are embodied in a switch 138 which moves between a door open contact 140 and a door closed contact 142 to condition the primary motor circuit for energization. The motor circuit will also include a start switch 156 to insure motor operation before heater operation and a drum switch 144 which is closed when the drum belt and pulley arrangement is in proper order. And, as a convenience, an alarm 146 may be provided to signal the end of the drying cycle.

With the foregoing components, the operation of an automatic dryer termination control will now be set forth. The knob 150 on the console of the dryer 10 and thus the timer shaft 127 are rotated to the On position to close timer contacts 1, 2 and 3 as seen in FIGURES 2 and 3. First, the motor 74 is energized from $L_1$ through the line 158, the timer switch 133, the door switch 138 on its door closed contact 142, the drum switch 144, the motor 74 and line 160 to the neutral N side of the power supply. At this time, the motor switch 156 will move to open the phase winding circuit of the motor and close the dryer heater circuit to condition the dryer heater 68 and the air diverter bimetal 104 for energization. Since the interior of the dryer is cool at the beginning of a cycle, the dryer heater 68 will be energized from $L_1$ through the timer switch 129, the heat selector switch 128 set on the High temperature thermostat contact 152, for example, the High temperature thermostat switch 130 (on its heater energized contact 163 to the low temperatures within the dryer), the high limit switch 134 (in its safe temperature position), the dryer heater 68, the air diverter bimetal 104, the motor speed switch 156 (moved to close the heater circuit when the motor starts), to the other side of the line $L_2$. The tumbling drum 18 is now rotating and the drying heater 68 is energized as is the bimetal 104 in the moisture sensing assembly 80. With the bimetal energized, the exhaust or recirculating air leaving the tumbling drum will be permitted to flow through the absorbing chamber 100 thereby enveloping the sense tube 92 and its covering of absorbent wicking.

So long as the timer contact 2 remains closed as shown in the cycle chart at 164, the timer motor 126 will be energized continuously by way of $L_1$, line 158, timer contact 2, line 166, timer motor 126 and the line 160 to the neutral N side of the line. However, when the timer contact 2 opens, the drying cycle will be under the control of the dew point related cycle termination device of this invention referred to hereinbefore as the moisture sensing assembly 80. From the point that the timer contact 2 opens, the timer motor 126 will be energized when the High temperature thermostat switch 130 is on its Timer On contact 162 and the dryer heater 68 will be energized when the switch 130 is on its Heater On contact 163. Thus, the timer motor circuit will be alternately energized when the dryer heater is de-energized and vice versa for an indeterminate period 170 depending on the length of drying time required to remove the moisture from the clothing being dried. This indeterminate period is in addition to the predetermined cycle built into the timer and thus extends the total drying time in accordance with the drying characteristics of each load. It is the moisture sensing assembly 80 that comes into play at this time to sense the condition of the air leaving the tumbling drum and, consequently, the point at which the drying cycle should be terminated as described more fully next following.

For purposes of illustrating the operation of the moisture sensor 80, assume that the High temperature thermostat switch 130 is on its Heater On contact 163 during the intermediate period in which the timer contact 2 is open. It can be seen that the air diverter bimetal 104 will be energized to establish communication between the absorbent chamber 100 and the recirculation air inlet 98. During this period air from the tumbling drum surrounds the wicking 118 of the sense tube and moisture is absorbed by the wicking—the quantity of moisture absorbed being indicative of the clothes dryness condition. However, as soon as the temperature in the drum increases to the point of moving the thermostatic switch 130 to its contact 162 the timer motor comes on (dew point switch 121 being closed during the time that moisture is being absorbed on the wicking), the air diverter bimetal 104 is de-energized and the recirculating air inlet 98 is closed as soon as the bimetal cools. This valving action opens the absorbing chamber 100 to the fresh air inlet 96 and allows relatively cool ambient air to pass over the wicking. Since the wicking has absorbed a quantity of moisture, evaporative cooling takes place. If the wick has sufficient moisture in it to produce a cooling effect on the dew point thermostat bulb 120, the thermostat switch 121 opens and stops the timer motor. As soon as the drum air temperature drops again the thermostat 130 will cycle the dryer heater on for another of the repetitive cycles in the indeterminate period 170. If the dew point thermostat bulb does not sense a drop in temperature due to lack of moisture in the wicking, the timer motor continues to run, responsive only to the dryer control thermostat 130, and the drying cycle is terminated. It should be understood that the alternating dryer heater-timer motor operation may continue repeatedly throughout the indeterminate cycle 170. But once the dew point thermostat switch 121 fails to open, this indicates that the wicking 118 has not absorbed moisture from the exhaust air and the clothes are apparently in a dry condition. When this happens the drying cycle will be run out with a conventional No Heat portion to lower the temperature of the properly dried clothes, the opening of timer contact 1 serving this end. Finally, the cycle will terminate with the timer contact 4 closing to ring the alarm 146.

It should be understood that the above description will apply also if the heat selector switch 128 has been set in series with the low temperature thermostat 132.

Although the foregoing has been explained in connection with a dryer termination control, the concept of this invention is much broader. It encompasses an indicating device wherein the moisture requirements of a wet bulb sock or wick are self-generating—a device which removes moisture from the very air being sensed in order to condition its wet bulb sensor. Well within the purview of this invention are relative humidity indicators using wet and dry bulb temperature sensors in a bridge circuit, condensate being collected on a cooled wet bulb indicator during a conditioning phase of the operation of the indicator for subsequent use during an R.H. reading phase. Cooling of such wet bulbs to generate moisture may be accomplished, as in the foregoing dryer control, with wicking cooled below the dew point of the air whose moisture is to be sensed or by using a thermocouple as a cold junction to condense moisture on itself during one cycle so that it can be used subsequently as a wet bulb during a later reading cycle.

While the embodiment of the present invention as herein disclosed constitutes a preferred form, it is to be understood that other forms might be adopted.

What is claimed is as follows:

1. In combination, means for sequentially conveying a gaseous medium into moisture absorbing contact with material to be dried and into moisture releasing contact with an absorbent means, means energizable for heating said gaseous medium, means periodically directly connectable either with said gaseous medium or the atmosphere for exposing said absorbent means to said gaseous medium when said heating means is energized whereby moisture from said gaseous medium is absorbed by said absorbent means and for exposing said absorbent means to atmospheric air when said heating means is de-energized whereby the moisture absorbed by said absorbent means is evaporated to create a cooling effect, timing means for controlling said heating means in a drying cycle of predetermined duration and including a timer motor, means thermally responsive to said gaseous medium downstream from said material and in thermally responsive power supply relationship with said heating means or said timer motor, timer switch means in power supply relationship to said thermally responsive means and actuated by said timer motor into a first position to initiate said drying cycle and into a second position to terminate said drying cycle, and dew point switch means responsive to the presence of moisture in said absorbent means and in series power supply interrupting relationship between said timer motor and said thermally responsive means for delaying the actuation of said timer switch means into said second position to extend said predetermined duration of said drying cycle, said dew point switch means being operable to interrupt the power supply to said timer motor in response to said cooling effect created by the evaporation of the moisture absorbed by said absorbent means when said absorbent means is exposed to said atmospheric air.

2. The combination of claim 1 including atmospheric air temperature regulating means for maintaining said absorbent means at a constant temperature when said absorbent means is exposed to said gaseous medium.

3. The combination of claim 2 including duct means for supporting said absorbent means on the outside thereof and having its inside connected to a source of atmospheric air, said atmospheric air temperature regulating means being in series atmospheric air flow relationship with said duct means.

4. In combination with a means supplying a stream of moisture laden air, means for sensing a moisture condition of said air stream, said means comprising means in moisture absorbing relationship to said air stream for absorbing moisture from said air stream, means including the atmosphere for maintaining said moisture absorbing means at a temperature below the dew point of said air stream, means for selectively directly connecting said moisture absorbing means in air flow relationship either to said air stream whereby moisture from said air stream is absorbed by said absorbing means or to said atmosphere whereby the moisture absorbed by said absorbing means is evaporated to create a cooling effect, and means responsive to the cooling effect of evaporation of the absorbed moisture from said moisture absorbing means when connected to the atmosphere for indicating said moisture condition.

5. The combination of claim 4 including a pair of nested ducts, one of said ducts supporting said moisture absorbing means in thermal exchange relationship therewith and being connected to the atmosphere, the other of said ducts enclosing said moisture absorbing means and being selectively connected to said air stream or said atmosphere by said selectively connecting means.

6. The combination of claim 5 wherein said selectively connecting means is a selectively energizable bimetal valve member upstream from said moisture absorbing means at the juncture of said other of said ducts with said air stream and said atmosphere.

7. In combination, casing means forming a drying chamber having an inlet and an outlet, a condenser for removing moisture from air circulating thereover, front duct means having a first end connected to said chamber outlet and another end, rear duct means connecting the outlet of said condenser to the inlet of said chamber, heating means adjacent the inlet to said chamber, a dew point termination control device having a recirculating air inlet connected to said other end of said front duct, a mixed air outlet connected to the inlet of said condenser and an atmospheric air inlet connected to the atmosphere, blower means for circulating air sequentially over said heating means, through said chamber and said condenser during a clothes drying cycle and for drawing ambient air through said ambient air inlet, said dew point termination control device comprising a first duct selectively connectable periodically to said recirculating air inlet or said atmospheric air inlet, air diverter bimetal means energizable for connecting said first duct to said recirculating air inlet and de-energizable for connecting said first duct to said atmospheric air inlet, a second duct inside of said first duct for supporting a quantity of wicking in said first duct adaptable to absorb moisture from said circulating air when said first duct is connected to said recirculating air inlet and to give up said moisture by evaporation when said first duct is connected to said atmospheric air inlet thereby to create a cooling effect, said second duct being connected in air flow receiving relationship to said ambient air inlet, a sense heater in said second duct, thermally responsive means for controlling said sense heater to maintain said ambient air at a predetermined temperature in said second duct, and a dew point thermostat means having actuator means in thermal exchange relationship with said wicking and having a clothes wet position in response to said cooling effect when said wicking is wet and a clothes dry position in response to a lack of said cooling effect when said wicking is dry, a power supply, a timer motor for starting and stopping said drying cycle, a drying temperature control switch connected to said power supply for controlling said heating means and said timer motor and having a first switch position in series with said heating means and said air diverter bimetal means and a second position in series with said dew point thermostat means and said timer motor, said dew point thermostat means conditioning said timer motor for energization to run out said drying cycle when in said clothes dry position and for conditioning said timer motor for de-energization to extend said drying cycle when in said clothes wet position.

8. A method for sensing the moisture condition of an air stream comprising the steps of positioning a moisture receiving means in selective direct communication with either said air stream or atmospheric air having a lower absolute humidity than said air stream, cooling said moisture receiving means below the dew point of said air stream, condensing moisture from said air stream on said moisture receiving means in response to said cooling, subsequently terminating the communication of said moisture receiving means with said air stream and exposing said moisture receiving means to said atmospheric air whereby the moisture condensed on said moisture receiving means is evaporated to create a cooling effect, and sensing the presence of moisture in said air stream in accordance with the presence or lack of said cooling effect while said moisture receiving means is exposed to said atmospheric air.

9. A device for sensing the moisture condition of an air stream comprising means for positioning a moisture receiving means in selective communication with either said air stream or a gaseous medium having a lower absolute humidity than said air stream, means for cooling said moisture receiving means below the dew point of said air stream to condense moisture from said air stream on said moisture receiving means while said moisture receiving means is in communication with said air stream, said moisture condensed on said moisture receiving means evaporating to create a cooling effect while said moisture receiving means is in communication with said gaseous medium, and means including said moisture receiving means for sensing said moisture condition of said air stream in accordance with the presence or lack of said cooling effect.

References Cited by the Examiner

UNITED STATES PATENTS

| | | | |
|---|---|---|---|
| 2,643,464 | 6/53 | Hadady | 73—336 |
| 2,820,304 | 1/58 | Horecky | 34—45 |
| 2,878,580 | 3/59 | Hughes | 34—45 |
| 2,895,230 | 7/59 | Reiley | 34—45 |
| 3,037,296 | 6/62 | Cooley | 34—45 |

PERCY L. PATRICK, *Primary Examiner.*

NORMAN YUDKOFF, *Examiner.*